United States Patent
Cheng

(10) Patent No.: US 6,373,695 B1
(45) Date of Patent: Apr. 16, 2002

(54) MOBILE RACK MOUNTING STRUCTURE FOR COMPUTER

(75) Inventor: Ying-Yie Cheng, Taoyuan (TW)

(73) Assignee: Mace Tech Corp., Taoyuan (TW)

( * ) Notice: Subject to any disclaimer, the term of this patent is extended or adjusted under 35 U.S.C. 154(b) by 26 days.

(21) Appl. No.: 09/667,791

(22) Filed: Sep. 22, 2000

(51) Int. Cl.$^7$ ................................................ G06F 1/16
(52) U.S. Cl. ..................... 361/685; 361/684; 361/685; 361/726; 361/727; 312/223.1; 312/223.2; 312/332.1; 364/708.1
(58) Field of Search ..................... 361/683, 684, 361/685, 686, 724–729, 732, 740, 747, 750, 759, 784, 789, 798, 801, 756, 802; 211/41.17; 312/223.1, 223.2, 223.3, 332.1, 111, 330.1, 319.1, 334.23, 333; 364/708.1, 478.01, 707; 268/300, 27.1, 27.3, 201, 694, 60, 581, 606, 611, 615, 634, 635, 638, 674; 360/97.01, 137; 70/57.1; 292/87

(56) References Cited

U.S. PATENT DOCUMENTS

| | | | | |
|---|---|---|---|---|
| 5,654,874 A | * | 8/1997 | Suzuki | 361/685 |
| 5,660,553 A | * | 8/1997 | Larabell | 439/160 |
| 5,668,696 A | * | 9/1997 | Schmitt | 361/685 |
| 5,726,922 A | * | 3/1998 | Womble et al. | 364/708.1 |
| 6,018,456 A | * | 1/2000 | Young et al. | 361/684 |
| 6,069,789 A | * | 5/2000 | Jung | 361/684 |
| 6,075,694 A | * | 6/2000 | Mills et al. | 361/685 |
| 6,088,221 A | * | 7/2000 | Bolognia | 361/685 |
| 6,088,222 A | * | 7/2000 | Schmitt et al. | 361/686 |
| 6,231,144 B1 | * | 5/2001 | Chen et al. | 312/332.1 |
| 6,238,026 B1 | * | 5/2001 | Adams et al. | 312/223.1 |
| 6,247,944 B1 | * | 6/2001 | Bolognia et al. | 439/157 |

* cited by examiner

Primary Examiner—Leo P. Picard
Assistant Examiner—Michael Datskovsky
(74) Attorney, Agent, or Firm—Troxell Law Office PLLC

(57) ABSTRACT

A mobile rack mounting structure includes a mounting frame fixedly mounted in a computer mainframe, and a plurality of CD-ROM player carriers detachably mounted in the mounting frame, the mounting frame having guide plates, supporting plates and retaining holes at two vertical side panels thereof, each CD-ROM player carrier having two sliding rails adapted for moving in and out of sliding tracks defined by the guide plates of the mounting frame, and two handles bilaterally disposed at a front side, the handles each having hooks adapted for engaging the retaining holes at the vertical side panels of the mounting frame.

5 Claims, 4 Drawing Sheets

MOBILE RACK MOUNTING STRUCTURE FOR COMPUTER

BACKGROUND OF THE INVENTION

The present invention relates to a mobile rack mounting structure for computer and, more particularly, to such a mobile rack mounting structure, which comprises a mounting frame fixedly mounted in a computer mainframe, and a plurality of CD-ROM player carriers detachably mounted in the mounting frame to carry a respective CD-ROM player.

The CD-ROM player of a computer is fixedly mounted inside the mainframe of the computer. This fixed design complicates the maintenance and repair work of the CD-ROM player. When repairing the CD-ROM player, the housing of the mainframe of the computer must be opened so that the CD-ROM player can be dismounted from the rack in the mainframe of the computer.

SUMMARY OF THE INVENTION

The invention has been accomplished to provide a mobile rack mounting structure, which eliminates the aforesaid problem. According to one aspect of the present invention, the mobile rack mounting structure comprises a mounting frame fixedly mounted in a computer mainframe, and a plurality of CD-ROM player carriers detachably mounted in the mounting frame, the mounting frame having guide plates, supporting plates and retaining holes at two vertical side panels thereof, each CD-ROM player carrier having two sliding rails adapted for moving in and out of sliding tracks defined by the guide plates of the mounting frame, and two handles bilaterally disposed at a front side, the handles each having hooks adapted for engaging the retaining holes at the vertical side panels of the mounting frame. According to another aspect of the present invention, each handle comprises a loop-like handgrip disposed at a front side and inserted through a through hole on a front flange of one vertical side panel of the corresponding CD-ROM player carrier, a rear mounting plate fastened to retainer rods at one vertical side panel of the corresponding CD-ROM player carrier, a middle positioning spring plate connected between the loop-like handgrip and the rear mounting plate, a bend connected between the middle positioning spring plate and the rear mounting plate, and two hooks raised from the middle positioning spring plate and adapted for hooking in one pair of retaining holes in one vertical side panel of the mounting frame.

DETAILED DESCRIPTION OF THE PREFERRED EMBODIMENT

Figure 1:
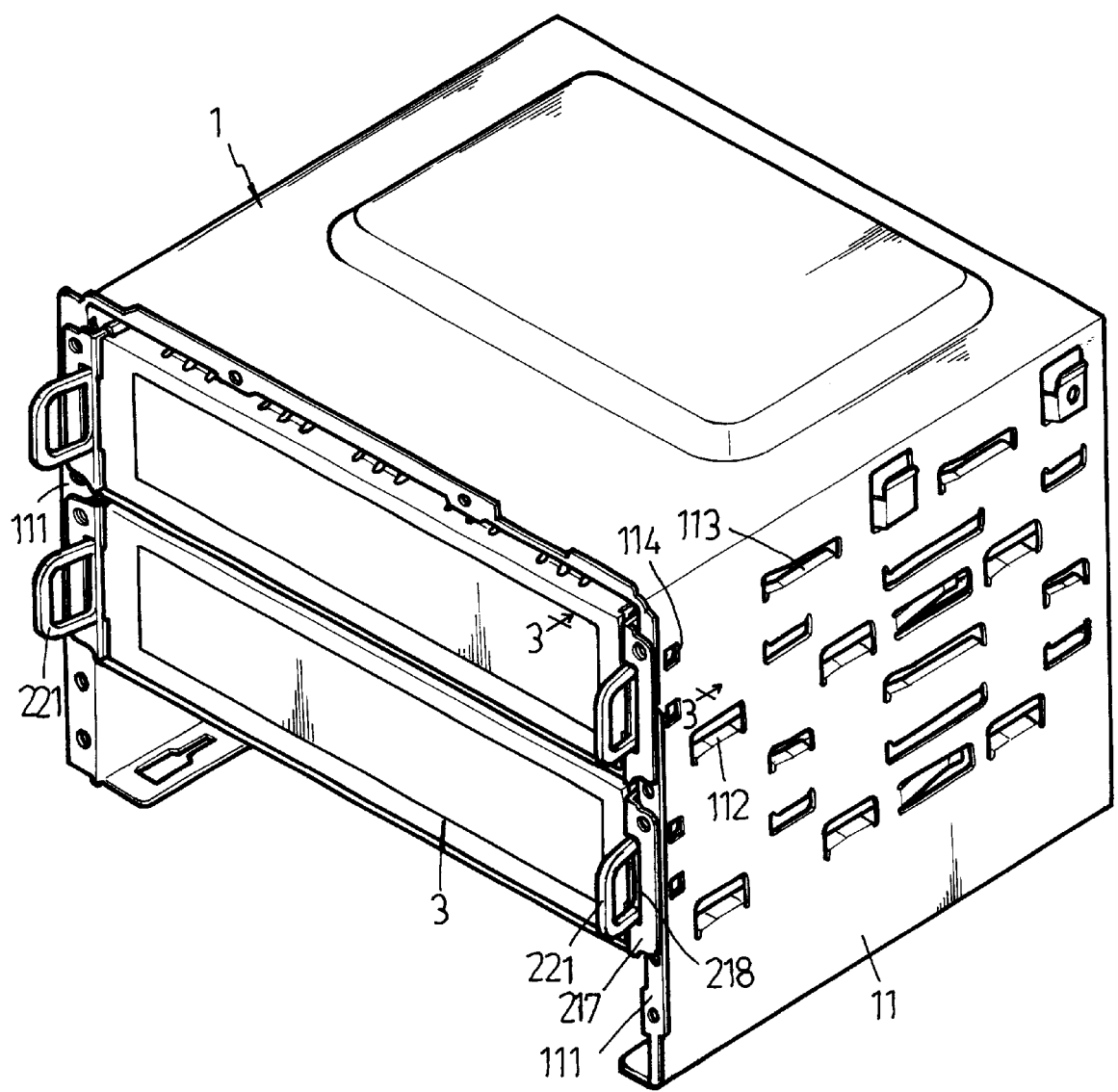
FIG. 1 is an elevational view of a mobile rack mounting structure constructed according to the present invention.
Figure 2:
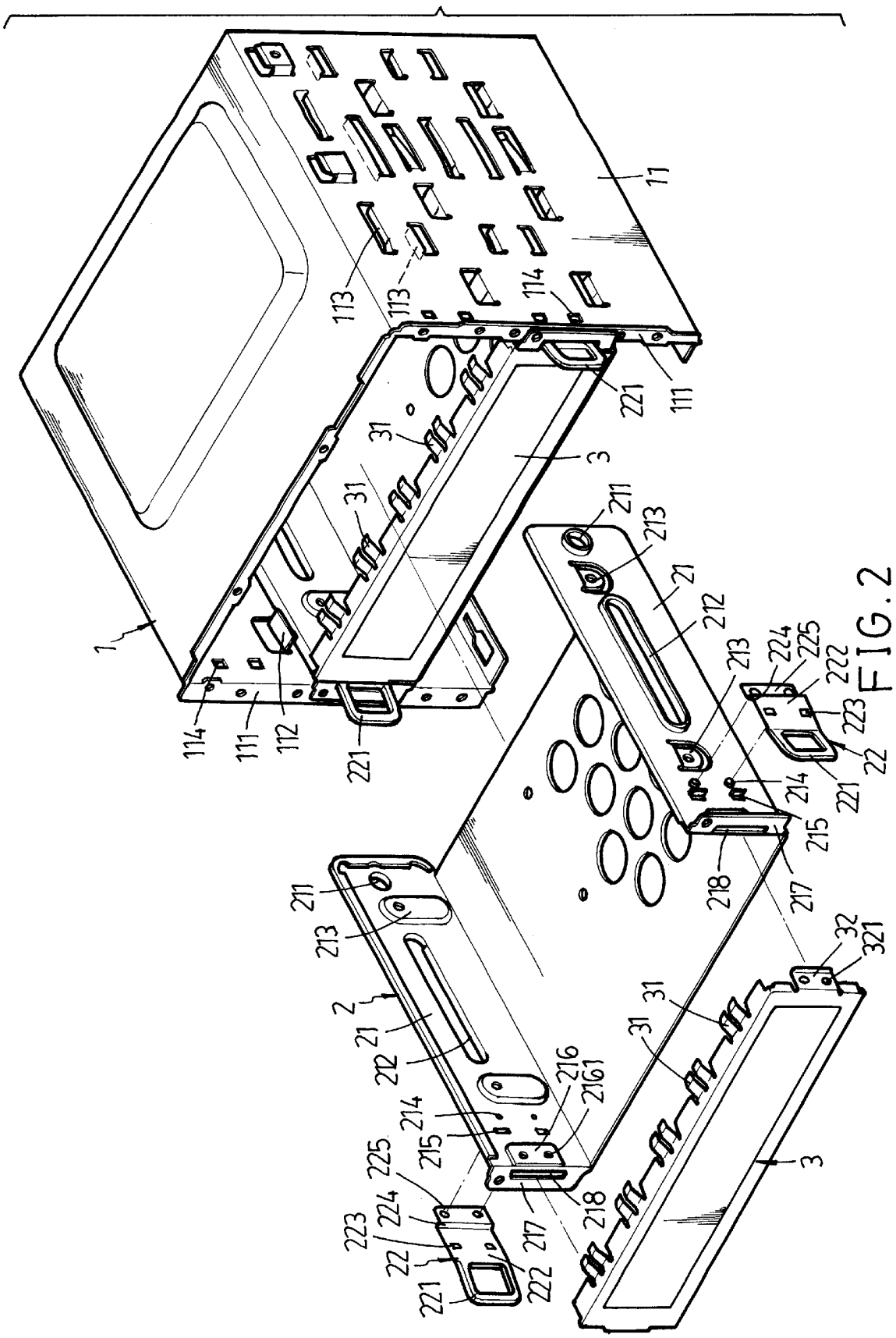
FIG. 2 is an exploded view of the present invention.
Figure 3:
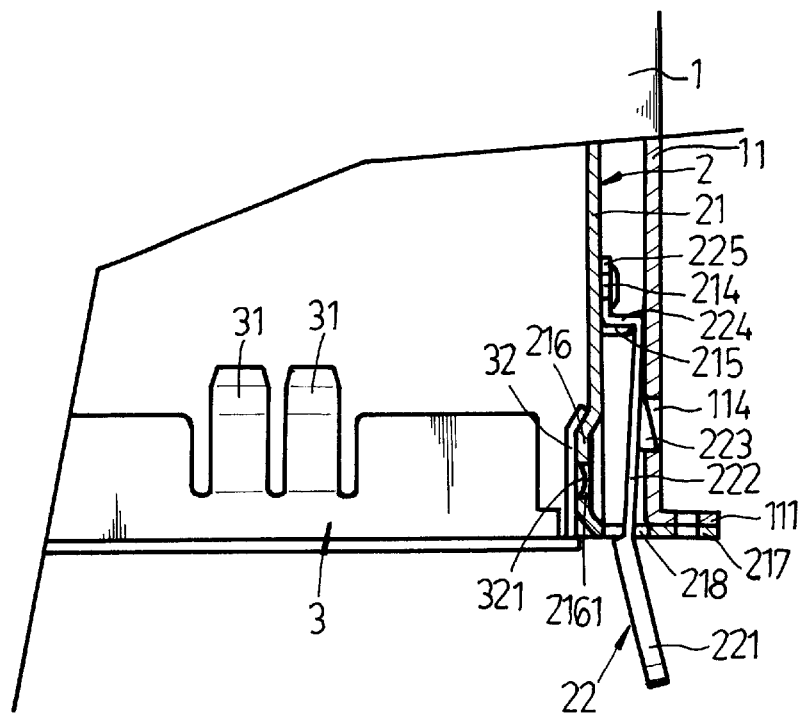
FIG. 3 is a sectional view taken along line 3—3 of FIG. 1.

Referring to FIGS. from 1 through 3, a mobile rack mounting structure for computer in accordance with the present invention is generally comprised of a mounting frame 1, and a plurality of CD-ROM player carriers 2 adapted for mounting in the mounting frame 1. The mounting frame 1 comprises two vertical side panels 11 perpendicularly downwardly extended from two sides of a horizontal top panel thereof. The side panels 11 each comprise a front flange 111 perpendicularly outwardly extended from the front side thereof, pairs of retaining holes 114 vertically spaced near the front flange 111, horizontal rows of supporting plates 112 inwardly disposed at different elevations and adapted to hold the CD-ROM player carriers 2 in the mounting frame 1, and sets of guide plates 113 inwardly disposed at different elevations and adapted to guide the CD-ROM player carriers 2 into position when inserting the CD-ROM player carriers 2 into the mounting frame 1. Each set of guide plates 113 defines a horizontal sliding track adapted to receive one CD-ROM player carrier 2.

The CD-ROM player carriers 2 each comprise two vertical side panels 21 perpendicularly upwardly extended from two sides of the horizontal bottom panel thereof, and two handles 22 respectively fastened to the vertical side panels 21 at a front side. The vertical side panels 21 each comprise a horizontal sliding rail 212 on the middle, a guide member 211 near the rear side thereof, two reinforcing recesses 213 disposed near two distal ends of the horizontal sliding rail 212 to reinforce the respective vertical side panel 21 against torsional force, a front flange 217 perpendicularly outwardly extended from the front side thereof, a through hole 218 through the front flange 217, two retainer rods 214 raised from the outside wall thereof at different elevations adjacent to the front flange 217, two receptacles 216 disposed at the inside wall thereof at different elevations near the front flange 217, each receptacle 216 having a recessed portion 2161, and two lugs 215 raised from the outside wall at different elevations and spaced between the retainer rods 214 and the front flange 217. By means of the guide members 211, the horizontal sliding rails 212 of the CD-ROM player carriers 2 can be inserted into respective tracks formed of the guide plates 113, keeping the CD-ROM player carriers 2 supported on the respective horizontal rows of supporting plates 112. The handles 22 each comprise a loop-like handgrip 221 disposed at a front side and inserted through the through hole 218 on the front flange 217 of one vertical side panel 21 of the corresponding CD-ROM player carrier 2, a rear mounting plate 225 fastened to the retainer rods 214 at one vertical side panel 21 of the corresponding CD-ROM player carrier 2, a middle positioning spring plate 222 connected between the loop-like handgrip 221 and the rear mounting plate 225, a bend 224 connected between the middle positioning spring plate 222 and the rear mounting plate 225 and supported on the lugs 215 at one vertical side panel 21 of the corresponding CD-ROM player carrier 2, and two hooks 223 raised from the middle positioning spring plate 222 and hooked in one pair of retaining holes 114 in one vertical side panel 11 of the mounting frame 1. After insertion of one CD-ROM player carrier 2 into the mounting frame 1, the front flanges 217 of the CD-ROM player carrier 2 are respectively forced into engagement with the front flanges 111 of the mounting frame 11. When pulling the handles 22 outwards with force, the front flanges 217 of the CD-ROM player carrier 2 are disengaged from the front flange 111 of the mounting frame 1, and therefore the CD-ROM player carrier 2 is smoothly removed from the mounting frame 1.

After installation of one CD-ROM player carrier 2 in the mounting frame 1, a cover plate 3 is covered on the front side of the CD-ROM player carrier 2. The cover plate 3 comprises two springy positioning end plates 32, each springy positioning end plate 32 having two raised portions 321 adapted for engaging the recessed portions 2161 of the receptacles 216 at each vertical side panel 21 of the CD-ROM player carrier 2, and a plurality of springy retainer legs 31 adapted for pressing on the top side wall of the horizontal bottom panel of the corresponding CD-ROM player carrier 2 and the bottom side wall of the horizontal bottom panel of another CD-ROM player carrier 2 above. The cover plate 2 protects the corresponding CD-ROM player against dust, and prevents electromagnetic waves from discharging to the outside.

Figure 4:
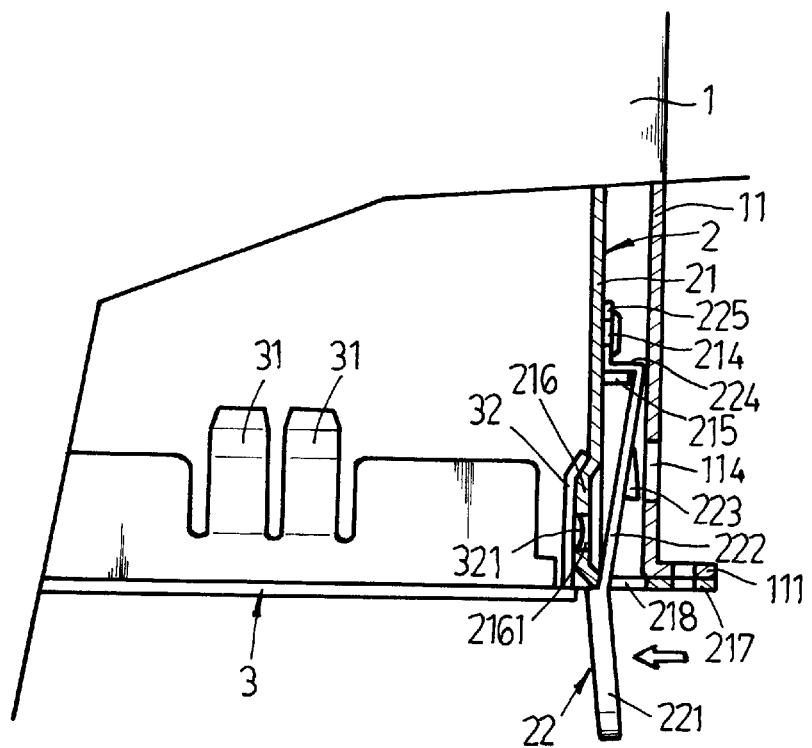
FIG. 4 is similar to FIG. 3 but showing the loop-like handgrip pressed inwards.
Figure 5:
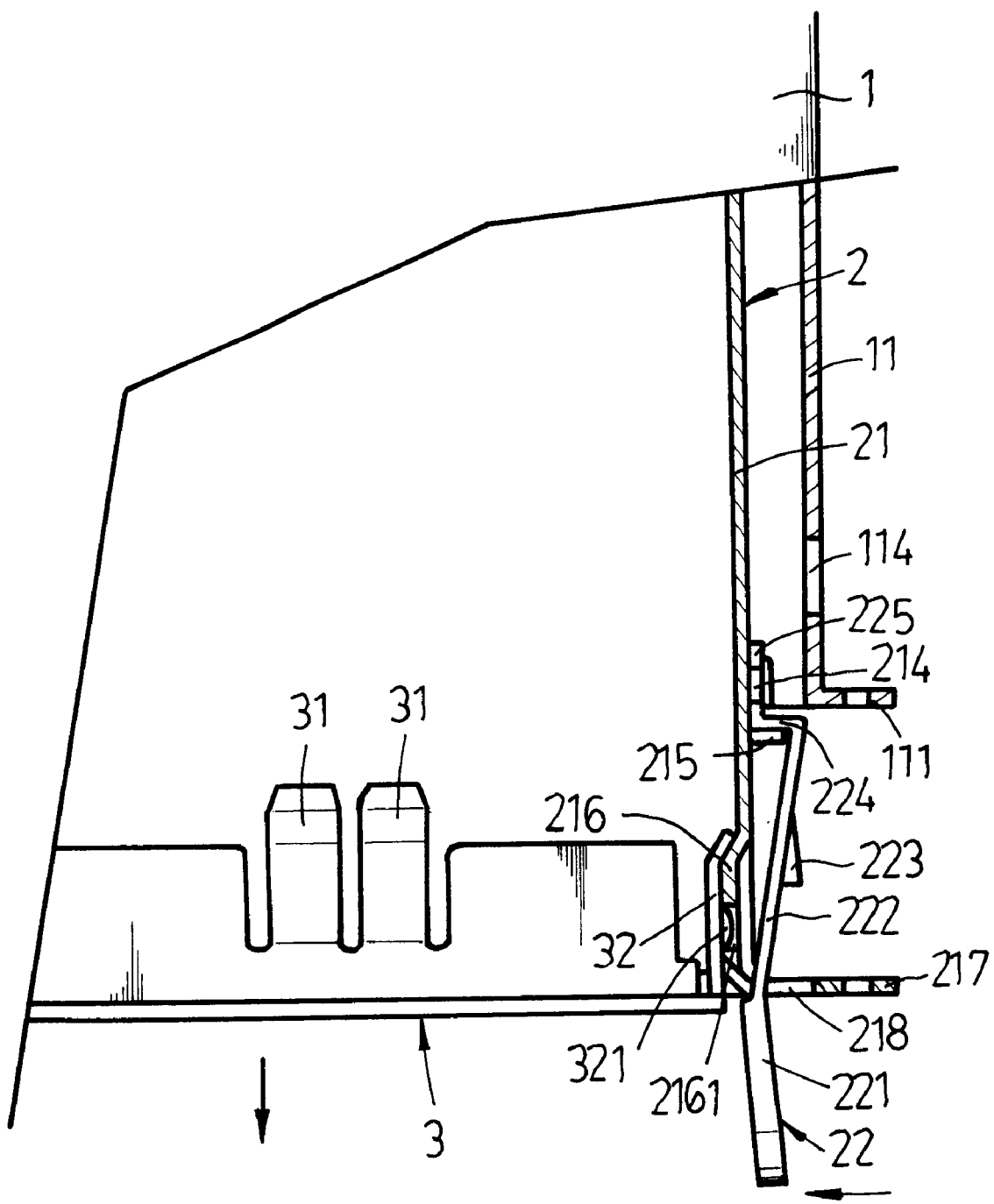
FIG. 5 is similar to FIG. 4 but showing the handle disengaged from the mounting frame, the CD-ROM player carrier pulled out of the mounting frame.

Referring to FIGS. 4 and 5, when pressing the loop-like handgrip 221 of each handle 22 of one CD-ROM player carrier 2 inwards, the respective hooks 223 are disengaged from the retaining holes 114 of the mounting frame 1, and the respective CD-ROM player carrier 2 can then be smoothly pulled out of the mounting frame 1.

While only one embodiment of the present invention has been shown and described, it will be understood that various modifications and changes could be made thereunto without departing from the spirit and scope of the invention disclosed.

What the invention claimed is:

1. A mobile rack mounting structure for computer comprising:
    a mounting frame fixedly mounted inside a computer mainframe, said mounting frame comprising two vertical side panels, the side panels of said mounting frame each comprising a front flange perpendicularly outwardly extended from a front side thereof, at least one pair of retaining holes vertically spaced near the front side, at least one horizontal row of supporting plates inwardly disposed at different elevations, and at least one set of guide plates inwardly disposed at different elevations and defining a respective horizontal sliding track; and
    at least one CD-ROM player carrier respectively inserted into said mounting frame and supported on said at least one horizontal row of supporting plates, said at least one CD-ROM player carrier each comprising two vertical side panels and two handles respectively fastened to the vertical side panels at a front side, the vertical side panels of each of said at least one CD-ROM player carrier each comprising a horizontal sliding rail adapted for inserting into one sliding track of said mounting frame, a front flange perpendicularly outwardly extended from a front side hereof, a through hole through the respective front flange, two retainer rods raised from a outside wall thereof at different elevations adjacent to the respective front flange, and two recessed portions disposed at an inside wall thereof at different elevations near the respective front flange, said handles each comprising a loop-like handgrip disposed at a front side and inserted through the through hole on the front flange of one vertical side panel of the corresponding CD-ROM player carrier, a rear mounting plate fastened to the retainer rods at one vertical side panel of the corresponding CD-ROM player carrier, a middle positioning spring plate connected between said loop-like handgrip and said rear mounting plate, a bend connected between said middle positioning spring plate and said rear mounting plate, and two hooks raised from said middle positioning spring plate and hooked in one pair of retaining holes in one vertical side panel of said mounting frame.

2. The mobile rack mounting structure of claim 1 further comprising a cover plate respectively covered on each of said at least one CD-ROM player carrier at a front side, said cover plate comprising two springy positioning end plates, said springy positioning end plates each having two raised portions adapted for engaging the recessed portions at each vertical side panel of one CD-ROM player carrier.

3. The mobile rack mounting structure of claim 1 wherein each vertical side panels of each of said at least one CD-ROM player carrier comprises a guide member adapted to guide the sliding rail of the respective side panel into the corresponding sliding track.

4. The mobile rack mounting structure of claim 1 wherein each vertical side panel of each of said at least one CD-ROM player carrier comprises a plurality of reinforcing recesses.

5. The mobile rack mounting structure of claim 1 wherein each vertical side panel of each of said at least one CD-ROM player carrier comprises at least one lug adapted to support the bend of one handle.

* * * * *